(12) United States Patent
Huang et al.

(10) Patent No.: US 7,583,866 B2
(45) Date of Patent: Sep. 1, 2009

(54) OPTOELECTRONIC SYSTEM FOR SENSING AN ELECTRIC FIELD SIGNAL

(75) Inventors: Ming Chieh Huang, Taipei County (TW); Jui Jung Jao, Hsinchu (TW); Wen Lie Liang, Hsinchu (TW); Wen Chung Hsueh, Hsinchu (TW); J. Ch. Bolomey, Gis-sur-Yvette Cedex (FR)

(73) Assignee: Industrial Technology Research Institute, Hsinchu County (TW)

( * ) Notice: Subject to any disclaimer, the term of this patent is extended or adjusted under 35 U.S.C. 154(b) by 120 days.

(21) Appl. No.: 11/615,918

(22) Filed: Dec. 22, 2006

(65) Prior Publication Data

US 2007/0160318 A1 Jul. 12, 2007

(30) Foreign Application Priority Data

Dec. 30, 2005 (TW) .............................. 94147478 A

(51) Int. Cl.
*G02B 6/00* (2006.01)
(52) U.S. Cl. ......................................... 385/12; 385/123
(58) Field of Classification Search ....................... None
See application file for complete search history.

(56) References Cited

U.S. PATENT DOCUMENTS

| 4,552,151 | A | | 11/1985 | Bolomey et al. |
| 5,430,369 | A | | 7/1995 | Bolomey et al. |
| 5,491,335 | A | * | 2/1996 | Bucholtz et al. ........ 250/227.25 |
| 7,106,919 | B2 | * | 9/2006 | Kochergin et al. ............ 385/12 |
| 2005/0140550 | A1 | * | 6/2005 | Huang et al. .......... 343/700 MS |

* cited by examiner

*Primary Examiner*—Frank G Font
*Assistant Examiner*—Eric Wong
(74) *Attorney, Agent, or Firm*—WPAT, P.C.; Anthony King

(57) ABSTRACT

An optoelectronic system for sensing an electric field signal includes an optically modulated scattering module configured to convert an electric field signal into a modulated scattering signal based on an optical modulation signal, an optoelectronic sensing module configured to generate an optical signal upon receiving the modulated scattering signal, an optical detector coupled to the optoelectronic sensing module, a synchronous detection circuit configured to detect the modulated scattering signal received by the optoelectronic sensing module based on an electric modulation signal and a signal processing circuit electrically connected to the synchronous detection circuit for calculating the amplitude and phase of the electric field signal under test. The present optoelectronic system for sensing an electric field signal integrates a low-interference optically modulated scattering module and a low-interference optoelectronic sensing module for sensing the distribution of the electric field under test and provides for low interference and low cost.

19 Claims, 10 Drawing Sheets

OPTOELECTRONIC SYSTEM FOR SENSING AN ELECTRIC FIELD SIGNAL

BACKGROUND OF THE INVENTION (A) Field of the Invention

The present invention relates to an optoelectronic system for sensing an electric field signal, and more particularly, to an optoelectronic system for sensing an electric field signal that can avoid interference on sensing the spatial distribution of the electric field.

(B) Description of the Related Art

Technologies such as wireless communication and radio-frequency identification (RFID) must use antennae to emit electric field signals, and methods of meeting antenna emission field pattern requirements becomes an important topic on improving the product quality. An electric field signal can be sensed in many ways, including modulated scatterer technology for sensing the distribution of an electric field. Related arts have been published for decades, from the document "A modulated scatterer technique . . . -1955, IRE Trans. on microwave distribution" written by Richmond, J. H. to current updates such as U.S. Pat. No. 4,552,151 and U.S. Pat. No. 5,430,369.

The technologies described in the above documents all employ conductive wires to modulate and bias diodes inside a scatterer and also utilize a fast scan scheme so as to sense an electric field. As the wires for transmitting control signals may generate some electric field, the biasing operation of the diodes inside the scatterer through wires may interfere with the electric field signal to be sensed. This problem is particularly important for the accuracy of electric wave sensing (especially for micro antennae).

Furthermore, the technologies disclosed in U.S. Pat. No. 4,552,151 and U.S. Pat. No. 5,430,369 generally use a conventional antenna to receive a scattering signal and then transmit the signal to a signal processing circuit through a cable. The cable contains metal, which may affect the received scattering signal, thus causing a distortion of scattering signal. Therefore, the conventional receiving antenna cannot be placed closely to the scatterer configured to generate the scattering signal so as to avoid signal coupling.

SUMMARY OF THE INVENTION

One aspect of the present invention provides an optoelectronic system for sensing an electric field signal, which can avoid interference when sensing the spatial distribution of the electric field so as to avoid coupling between the electric field sensing module and the scattering module.

An optoelectronic system for sensing an electric field signal according to this aspect of the present invention comprises an optically modulated scattering module configured to convert an electric field signal into a modulated scattering signal based on an optical modulation signal, an optoelectronic sensing module configured to receive the modulated scattering signal, a detection circuit configured to detect the modulated scattering signal received by the optoelectronic sensing module based on an electric modulation signal and a signal processing circuit electrically connected to the detection circuit and configured to calculate the amplitude and the phase of the electric field signal.

The optoelectronic system for sensing an electric field signal according to this aspect of the present invention integrates the low-interference optically modulated scattering module and the low-interference optoelectronic sensing module for sensing the distribution of the electric field under test, and can be applied to sensing the near-field, SAR distribution, electric wave broadcasting, electro-compatibility analysis and so on. Moreover, the present invention also provides for low interference and low cost.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
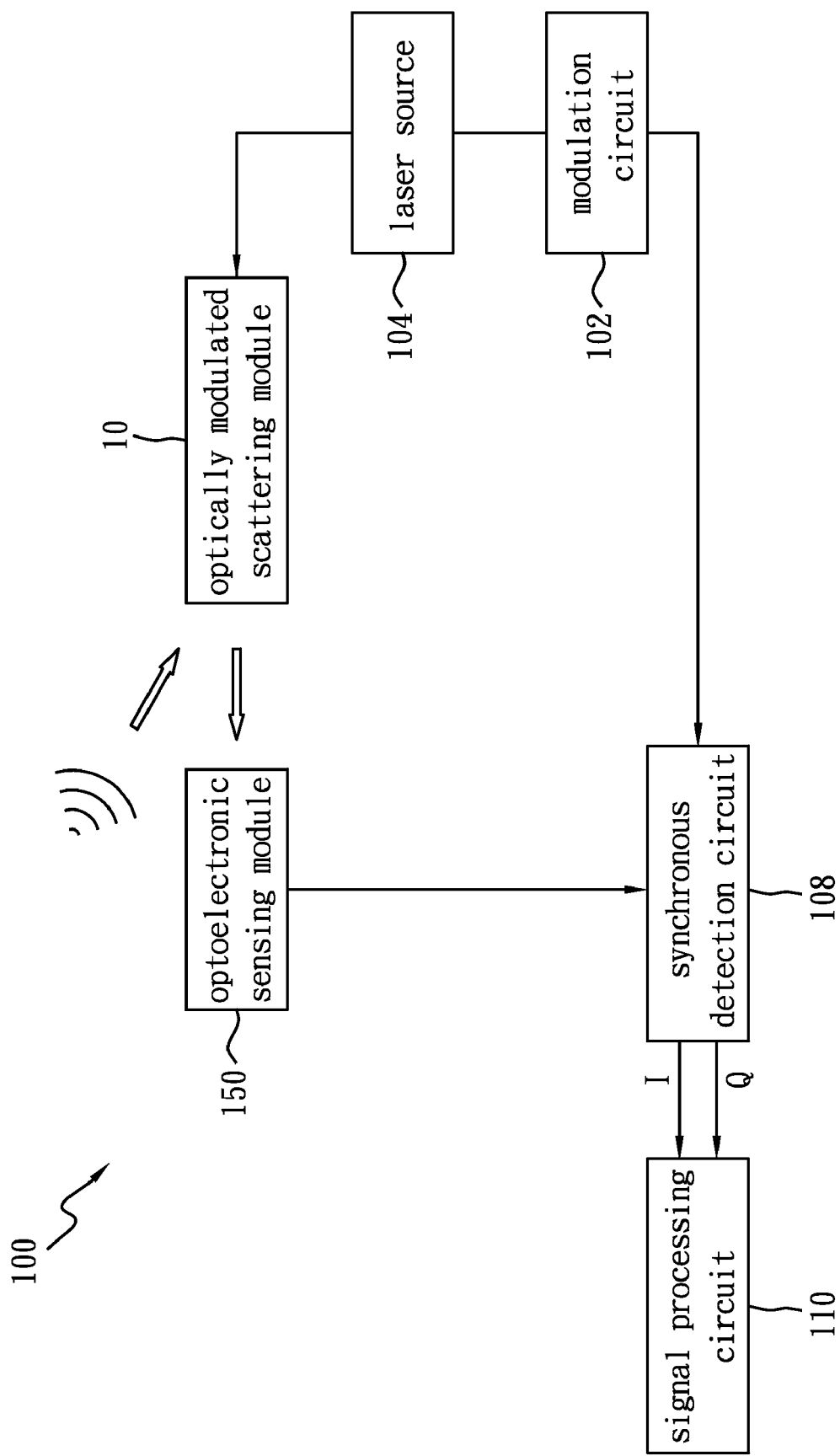
FIG. 1 illustrates an optoelectronic system for sensing an electric field signal according to a first embodiment of the present invention.

FIG. 1 illustrates an optoelectronic system 100 for sensing an electric field signal according to a first embodiment of the present invention. The optoelectronic system 100 comprises an optically modulated scattering module 10 and an optoelectronic sensing module 150. The optically modulated scattering module 10 is configured to convert an electric field signal under test into a modulated scattering signal based on an optical modulation signal. The optoelectronic sensing module 150 serves as an electric field sensor and is configured to receive the modulated scattering signal. The optoelectronic system 100 may further include a modulation circuit 102 configured to generate an electric modulation signal, at least one light source 104 configured to generate an optical modulation signal based on the electric modulation signal, a synchronous detection circuit 108 electrically connected to the modulation circuit 102 and a signal processing circuit 110 electrically connected to the synchronous detection circuit 108.

The optoelectronic sensing module 150 receives the modulated scattering signal and transmits it to the synchronous detection circuit 108. The synchronous detection circuit 108 generates a first phase signal I and a second phase signal Q with a 90° phase difference based on the modulated scattering signal and the electric modulation signal. The first phase signal I and the electric modulation signal have the same phase, and the second phase signal Q and the electric modulation signal have a 90° phase difference. The signal processing circuit 110 calculates the amplitude and phase of the electric field signal under test based on the first phase signal I and the second phase signal Q.

Figure 2:
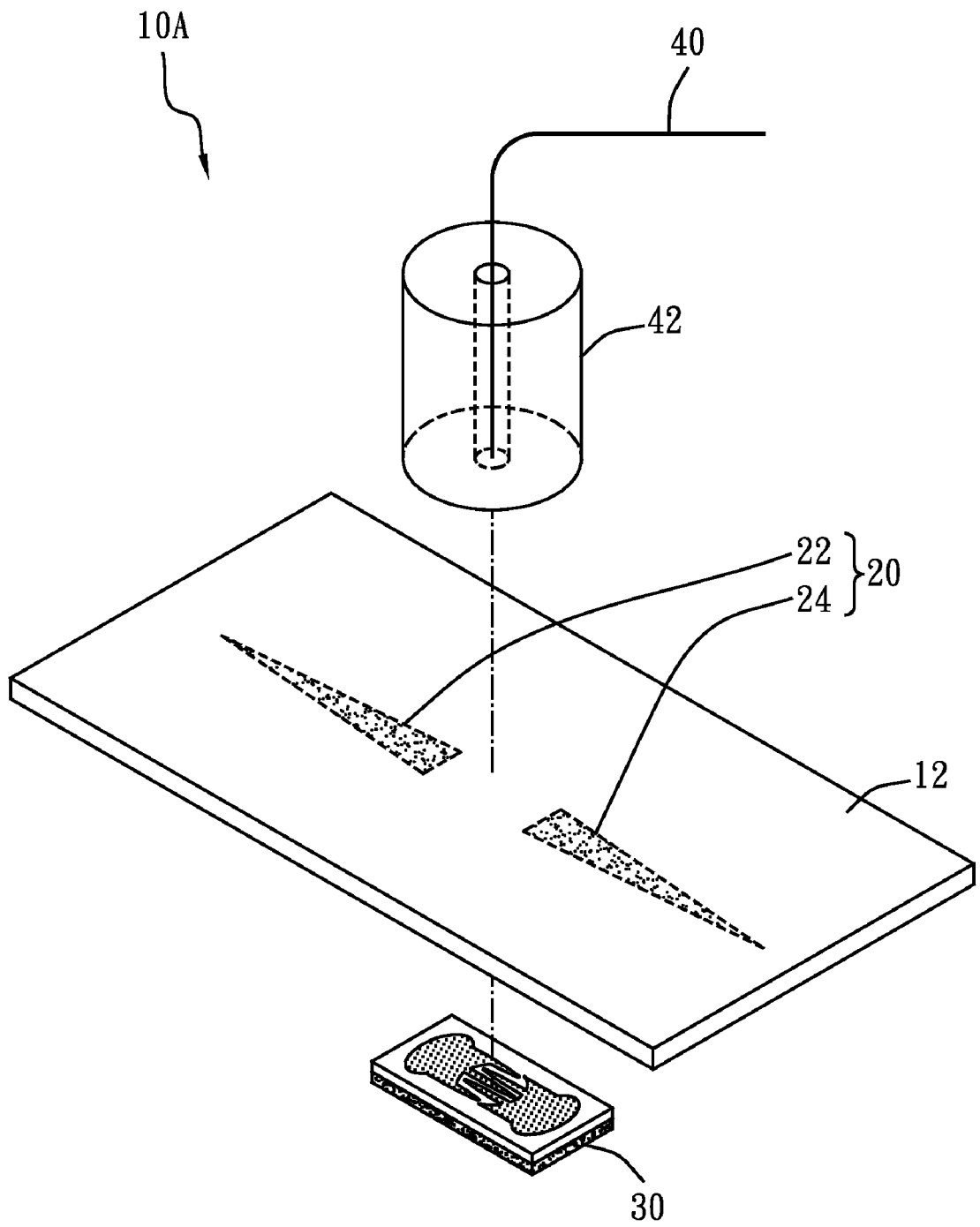
FIGS. 2 and 3 illustrate the optically modulated scattering module according to a first embodiment of the present invention.
Figure 3:
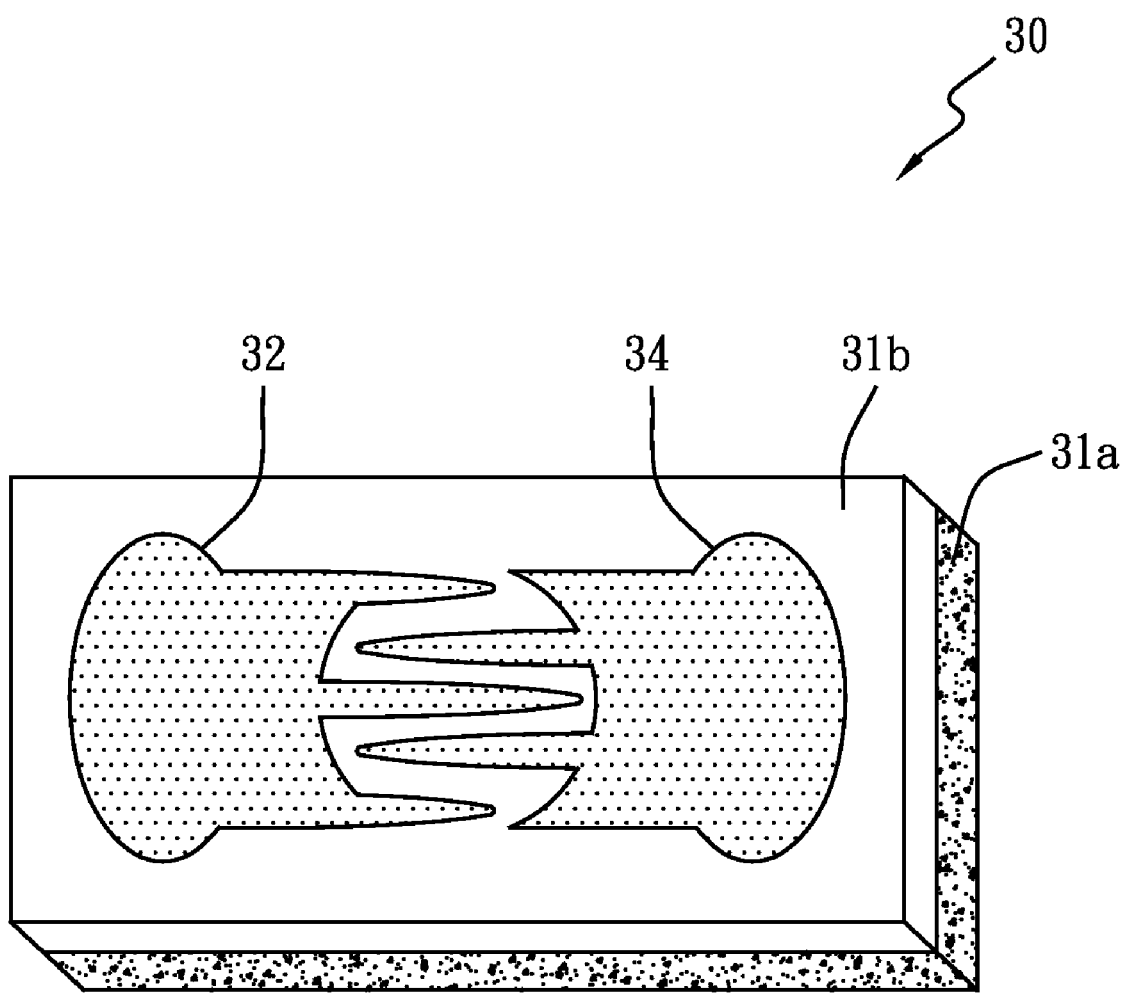

FIGS. 2 and 3 illustrate the optically modulated scattering module 10 according to a first embodiment of the present invention. The optically modulated scattering module 10 in FIGS. 2 and 3 is an optically modulated scatterer 10A. The optically modulated scatterer 10A includes a substrate 12, a scattering antenna 20 disposed on the bottom surface of the substrate 12, an optical switch 30 connected to the scattering antenna 20, an optical waveguide 40 configured to transmit an optical modulation signal and a sleeve 42 configured to fix the optical waveguide 40 onto the upper surface of the substrate 12. The scattering antenna 20 includes a first conductive segment 22 and a second conductive segment 24 disposed on the bottom surface of the substrate 12.

FIG. 3 is a schematic view of the optical switch 30 of the present invention. The optical switch 30 includes an intrinsic GaAs substrate 31a, a highly doped GaAs substrate 31b, and a first electrode 32 and a second electrode 34 disposed on the highly doped GaAs substrate 31b. The first electrode 32 and the second electrode 34 connect the first conductive segment 22 and the second conductive segment 24, respectively. The first electrode 32 and the second electrode 34 are interdigital, and the optical waveguide 40 is aligned with the interdigital region of the optical switch 30. In addition, the highly doped GaAs substrate 31b can be P type or N type, which can form an ohmic contact with the first electrode 32 and the second electrode 34.

When a light beam of an appropriate energy irradiates on the interdigital region of the optical switch 30, electron-hole pairs are generated to reduce the resistance between the first electrode 32 and the second electrode 34 of the optical switch 30, and the first electrode 32 and the second electrode 34 are conducted such that the first conductive segment 22 and the second conductive segment 24 are coupled to form a relatively long metallic scatterer. Consequently, the overall scattering section can be increased for enhancing the scattering signal emitted from the optically modulated scatterer 10A, wherein the enhanced scattering signal is positively proportional to the electric field where the optically modulated scatterer 10A is located. In particular, as the optical modulation signal of the optically modulated scatterer 10A is transmitted by the optical waveguide 40 instead of by a conductive cable in the conventional art, the electric field signal under test may not be interfered with.

Figure 4:
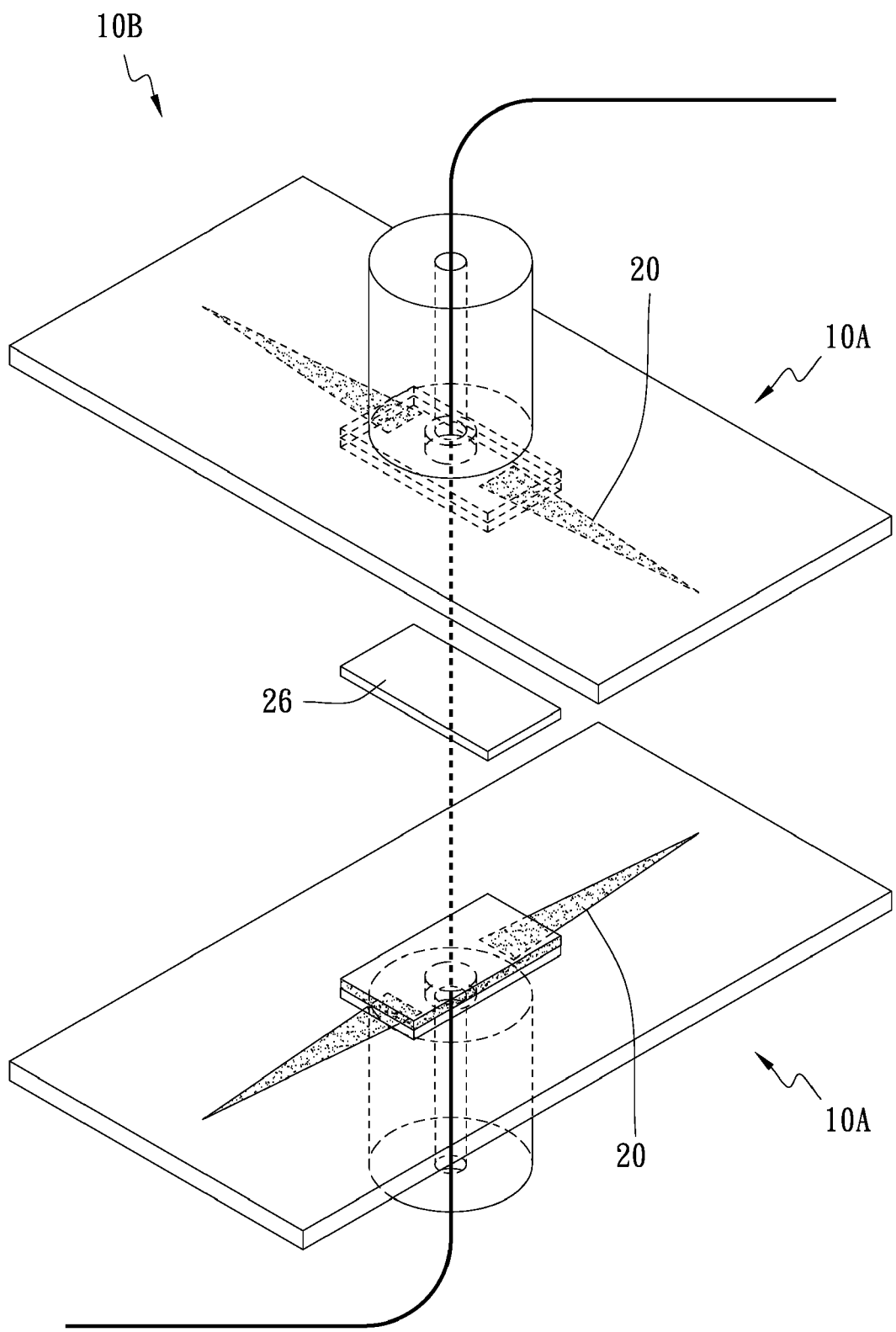
FIG. 4 illustrates the optically modulated scattering module according to a second embodiment of the present invention.

FIG. 4 illustrates the optically modulated scattering module 10 according to a second embodiment of the present invention. The optically modulated scattering module 10 in FIG. 4 is an optically modulated scatterer set 10B. The optically modulated scatterer set 10B includes a substrate 26 and two optically modulated scatterers 10A. The two optically modulated scatterers 10A are disposed on the upper and bottom surfaces of the substrate 26 respectively, and the scattering antennae 20 of the two optically modulated scatterers 10A are perpendicular to each other for sensing the spatial distribution of an electric field under test.

Figure 5:
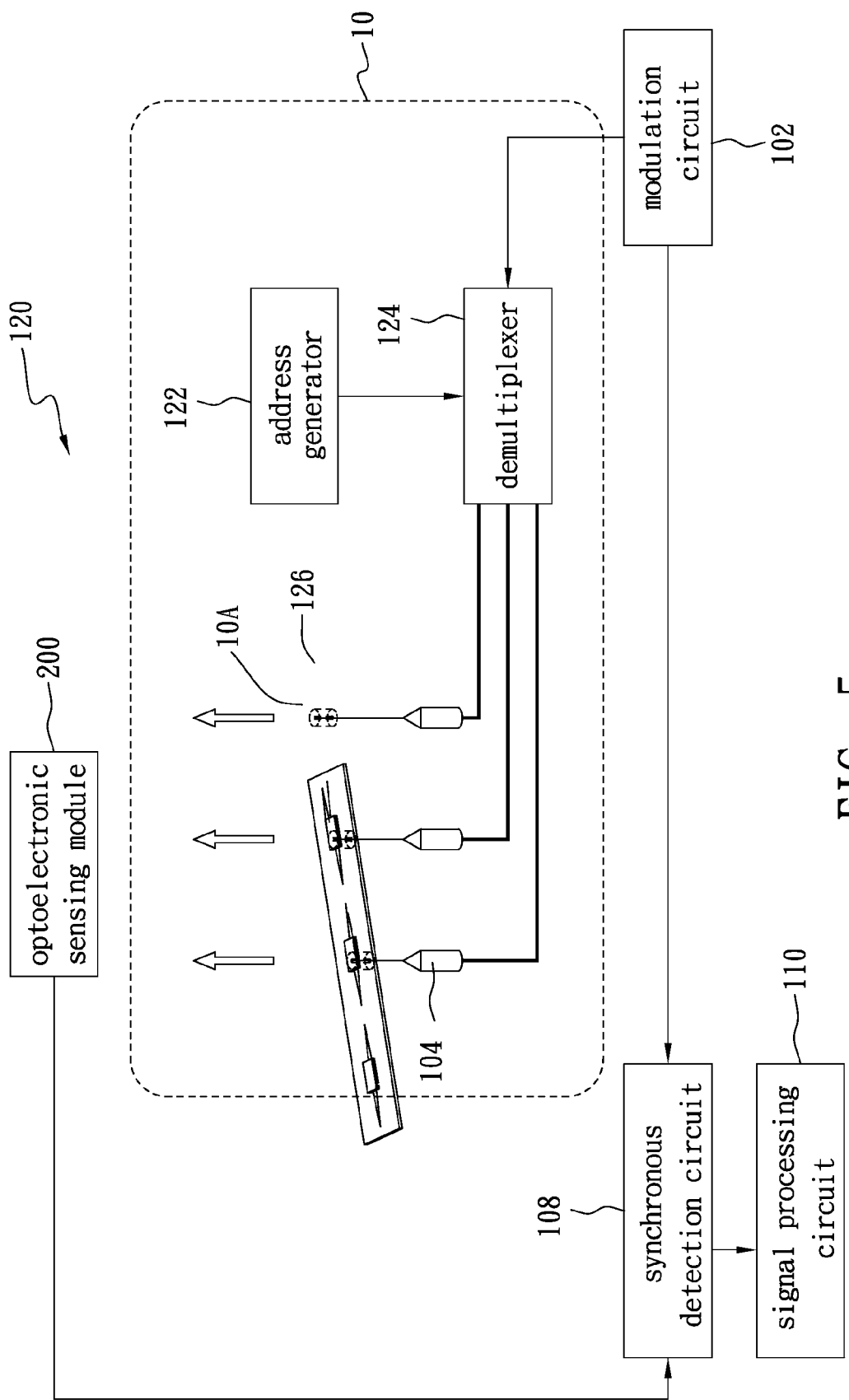
FIG. 5 illustrates an optoelectronic system for sensing an electric field signal according to a second embodiment of the present invention.

FIG. 5 illustrates an optoelectronic system 120 for sensing an electric field signal according to a second embodiment of the present invention. The optically modulated scattering module 10 of the optoelectronic system 120 includes an optically modulated scatterer array 126, an address generator 122, a demultiplexer 124 and a plurality of light sources 104, wherein the optically modulated scatterer array 126 includes a plurality of optically modulated scatterers 10A. The address generator 122 can generate an address signal (indicating a light source 104). The demultiplexer 124 enables the light source 104 indicated by the address signal to generate an optical modulation signal based on the address signal so as to modulate the optically modulated scatterer 10A connected to the light source 104 to generate a modulated scattering signal. By using the address generator 122 and the demultiplexer 124 to switch and control the plurality of optically modulated scatterers 10A, the optoelectronic system 120 can sense the distribution of the electric field where the optically modulated scatterer array 126 is located. The light source 104 can be a laser or a light emitting diode (LED).

Figure 6:
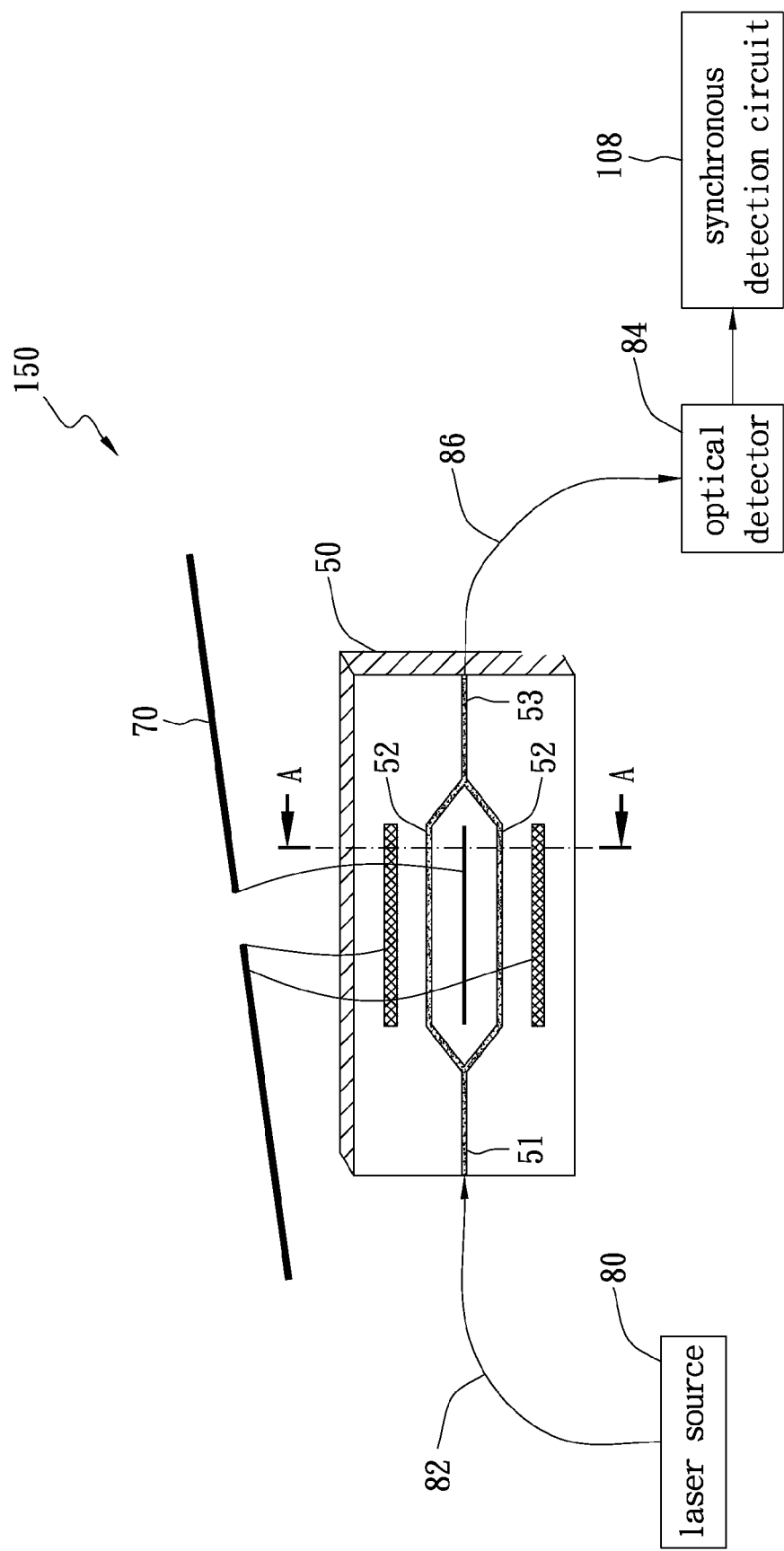
FIG. 6 illustrates the optoelectronic sensing module according to the first embodiment of the present invention.

FIG. 6 illustrates the optoelectronic sensing module 150 according to the first embodiment of the present invention. The optoelectronic sensing module 150 includes an optical modulator 50, an external dipole antenna 70, a light source 80, a first optical fiber 82, an optical detector 84 and a second optical fiber 86. The optical modulator 50 changes the phase of an optical wave propagating through the optical modulator 50 based on an applied electric field. The external dipole antenna 70 is configured to sense the modulated scattering signal generated by the optically modulated scattering module 10 and applies a corresponding electric field to the optical modulator 50. The light source 80 is configured to generate a light beam. The first optical fiber 82 is configured to transmit the light beam generated by the light source 80 to the optical modulator 50. The optical modulator 50 includes an optical input waveguide 51, two optical modulation waveguides 52 and an optical output waveguide 53. The optical detector 84 is configured to convert an optical input signal into an electric field signal. The second optical fiber 86 is configured to transmit the light beam output from the optical modulator 50 to the optical detector 84.

Figure 7:
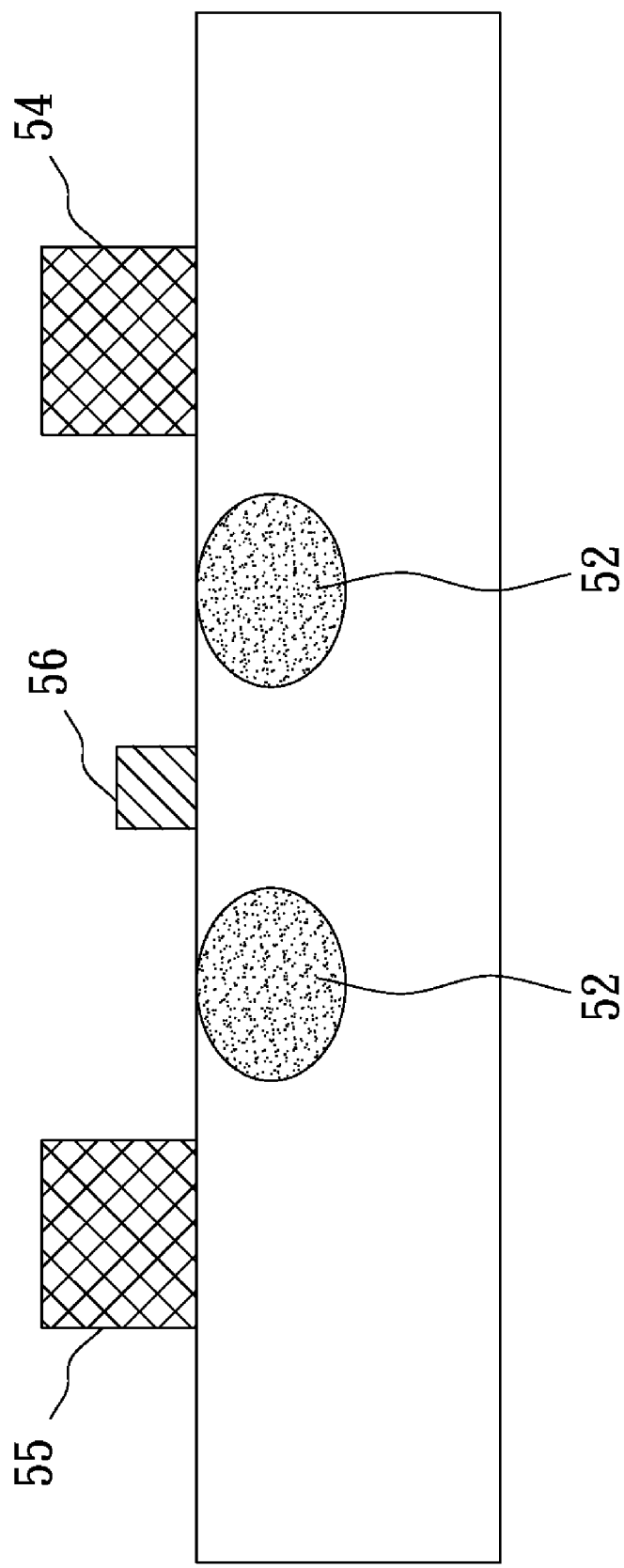
FIG. 7 is a cross-sectional view of the optical modulator in FIG. 6 along a cross-sectional line A-A.

FIG. 7 is a cross-sectional view of the optical modulator 50 in FIG. 6 along a cross-sectional line A-A. Two electrodes 54, 55 are disposed above the optical modulation waveguides 52 respectively, and an electrode 56 is disposed between the two electrodes 54, 55. The two electrodes 54, 55 are electrically connected to an output end of the external dipole antenna 70, and the electrode 56 is electrically connected to another output end of the external dipole antenna 70. When the external dipole antenna 70 senses the modulated scattering signal generated by the optically modulated scattering module 10, an electric field corresponding to the modulated scattering signal is applied between the electrodes 54, 55 and 56.

The light beam emitted from the light source 80 is coupled via the first optical fiber 82 into the optical input waveguide 51, splits to enter the optical modulation waveguides 52, and integrates to the optical output waveguide 53. When a potential difference is generated between the electrodes 54, 55 and the electrode 56, the refractive index of the optical modulation waveguides 52 changes such that the phase of the light beam propagating through the optical modulation waveguides 52 changes. Consequently, an interference light is formed at the optical output waveguide 53, and the output optical phase of the interference light depends on the potential difference between the electrodes 54, 55 and the electrode 56.

Figures 8A, 8B, 8C:
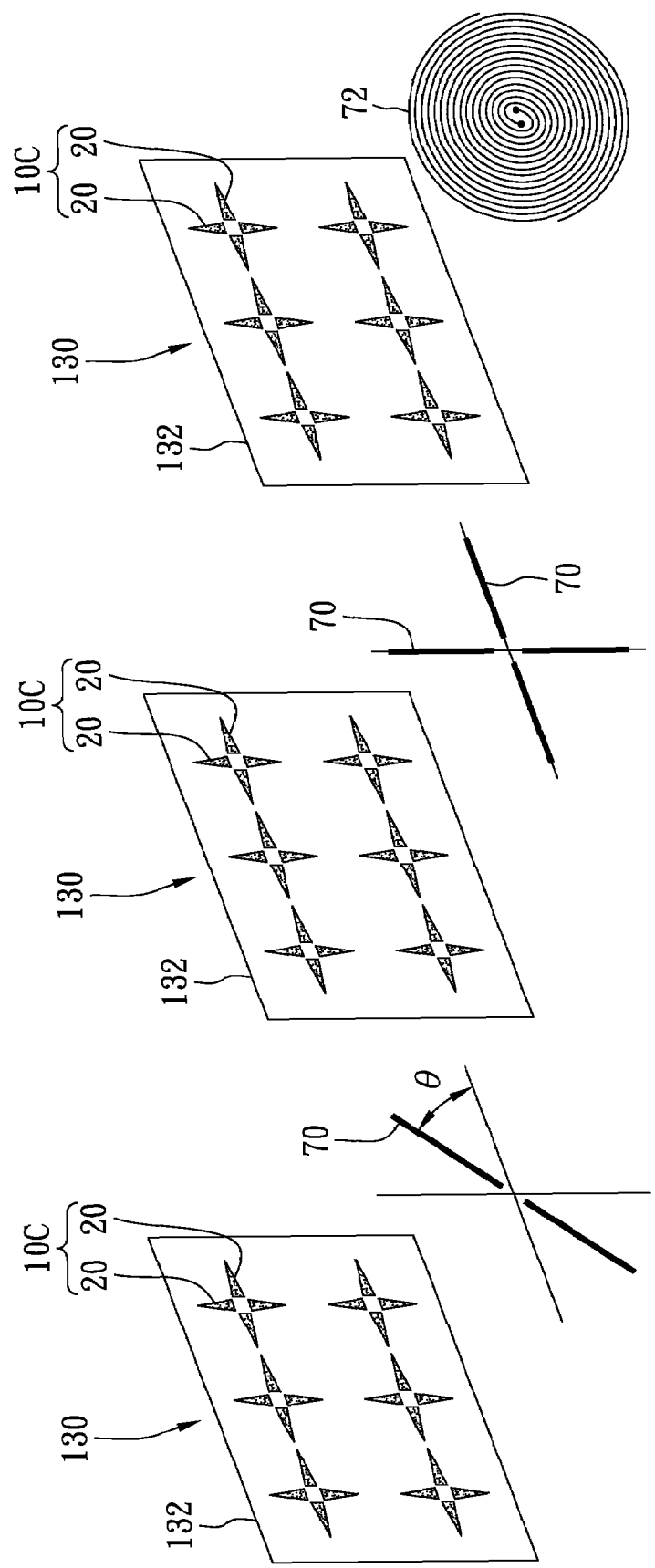
FIGS. 8(a) to 8(c) illustrate an optically modulated scattering module according to a third embodiment of the present invention.

FIGS. 8(a) to 8(c) illustrate an optically modulated scattering module 10 according to a third embodiment of the present invention. The optically modulated scattering module 10 in FIGS. 8(a) to 8(c) is an optically modulated scatterer array 130 including a substrate 132 and a plurality of optically modulated scatterer sets 10C arranged in a two-dimensional manner. Each optically modulated scatterer set 10C includes two optically modulated scatterers 10A perpendicular to each other for sensing the spatial distribution of an electric field under test. For the convenience of illustration, only the scattering antenna 20 of each optically modulated scatterer 10A is illustrated, and the corresponding optical switch 30 and optical waveguide 40 are not shown in the drawings.

Furthermore, the electric field under test, which is modulated by the optically modulated scatterer sets 10C, can be sensed by a single dipole antenna 70. The included angle θ between the dipole antennae 70 and the two scattering antennae 20 of the optically modulated scatterer sets 10C is less than 90°, as shown in FIG. 8(*a*). Moreover, the electric field under test, which is modulated by the optically modulated scatterer sets 10C, can be sensed by two sets of dipole antennae 70, wherein the two sets of dipole antennae 70 are arranged in the same direction as the two sets of scattering antennae 20 of the optically modulated scatterer sets 10C, as shown in FIG. 8(*b*). Further, the electric field under test, which is modulated by the optically modulated scatterer sets 10C, can also be sensed by a single circularly polarized antenna 72, as shown in FIG. 8(*c*).

Figure 9:
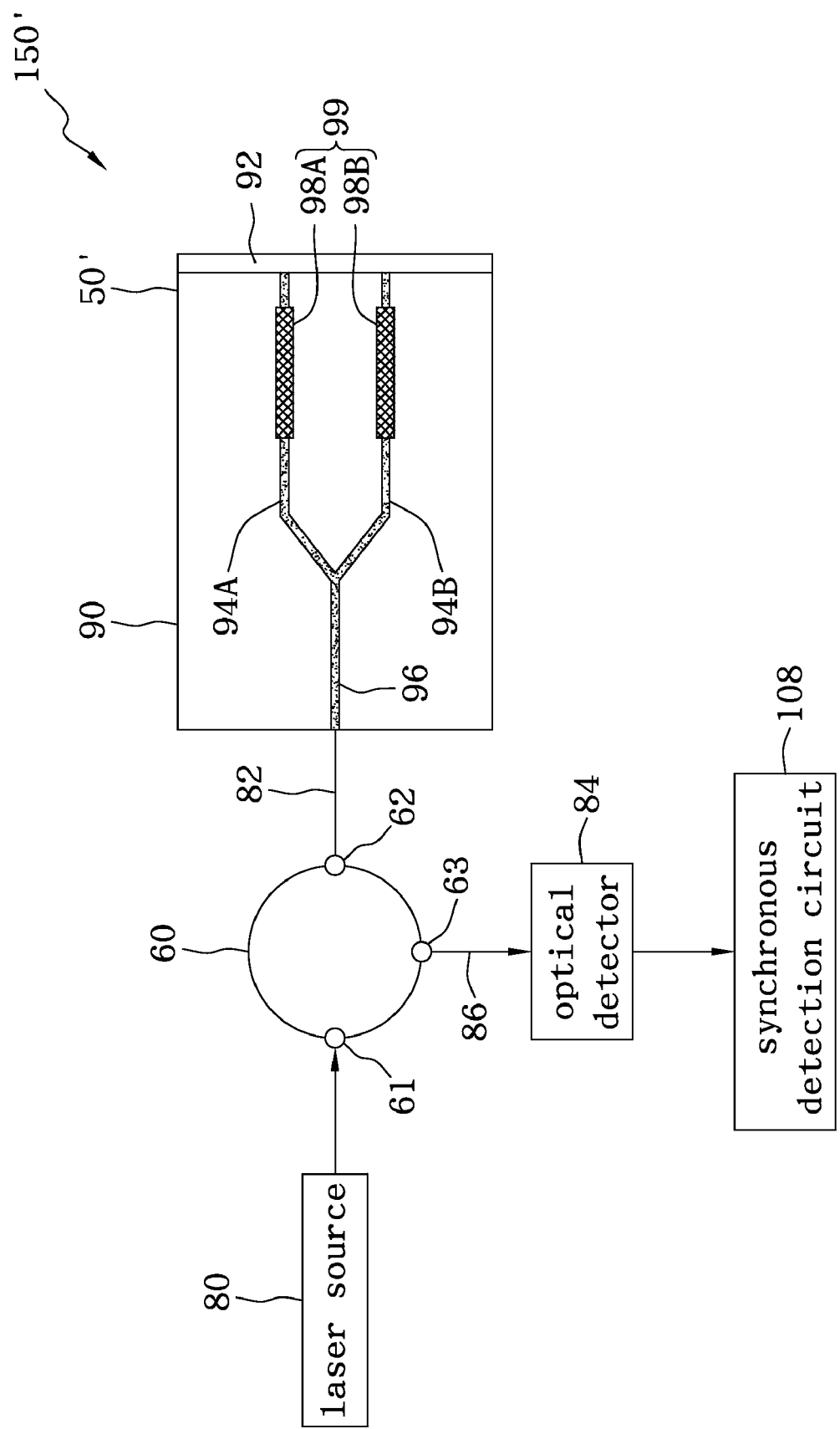
FIG. 9 illustrates an optoelectronic sensing module for sensing electric field according to a second embodiment of the present invention.

FIG. 9 illustrates an optoelectronic sensing module 150' for sensing electric field according to a second embodiment of the present invention. Compared with the optoelectronic sensing module 150 in FIG. 6, the optoelectronic sensing module 150' shown in FIG. 9 includes an optical modulator 50' and an optical circulator 60. In particular, the optical circulator 60 includes a first port 61, a second port 62 and a third port 63. The light beam emitted from the light source 80 is input into the optical circulator 60 via the first port 61 and output to a first optical fiber 82 via the second port 62. The optical modulator 50' is connected to the second port 62 via the first optical fiber 82. The optical detector 84 is connected to the third port 63 via a second optical fiber 86.

The optical modulator 50' includes a substrate 90, a mirror 92 disposed on a side surface of the substrate 90, an optical input/output waveguide 96 disposed in the substrate 92, two optical modulation waveguides 94A, 94B disposed in the substrate 90 and an antenna 99 disposed on the surface of the substrate 90. One end of the optical modulation waveguides 94A, 94B is coupled to the optical input/output waveguide 96, and the other end is terminated at the mirror 92. The light beam is input into the optical circulator 60 via the first port 61, and output from the second port 62 and couples into the optical input/output waveguide 96. Subsequently, the light beam is split to enter the optical modulation waveguides 94A, 94B, reflected by the mirror 92 and then transmitted to the second port 62 of the optical circulator 60 along the original path. Afterwards, the light beam is output from the third port 63 into the optical detector 84. The antenna 99 consisting of two conductive segments 98A, 98B is disposed on the surface of the substrate 90 above the optical modulation waveguides 94A, 94B, respectively.

Figure 10:
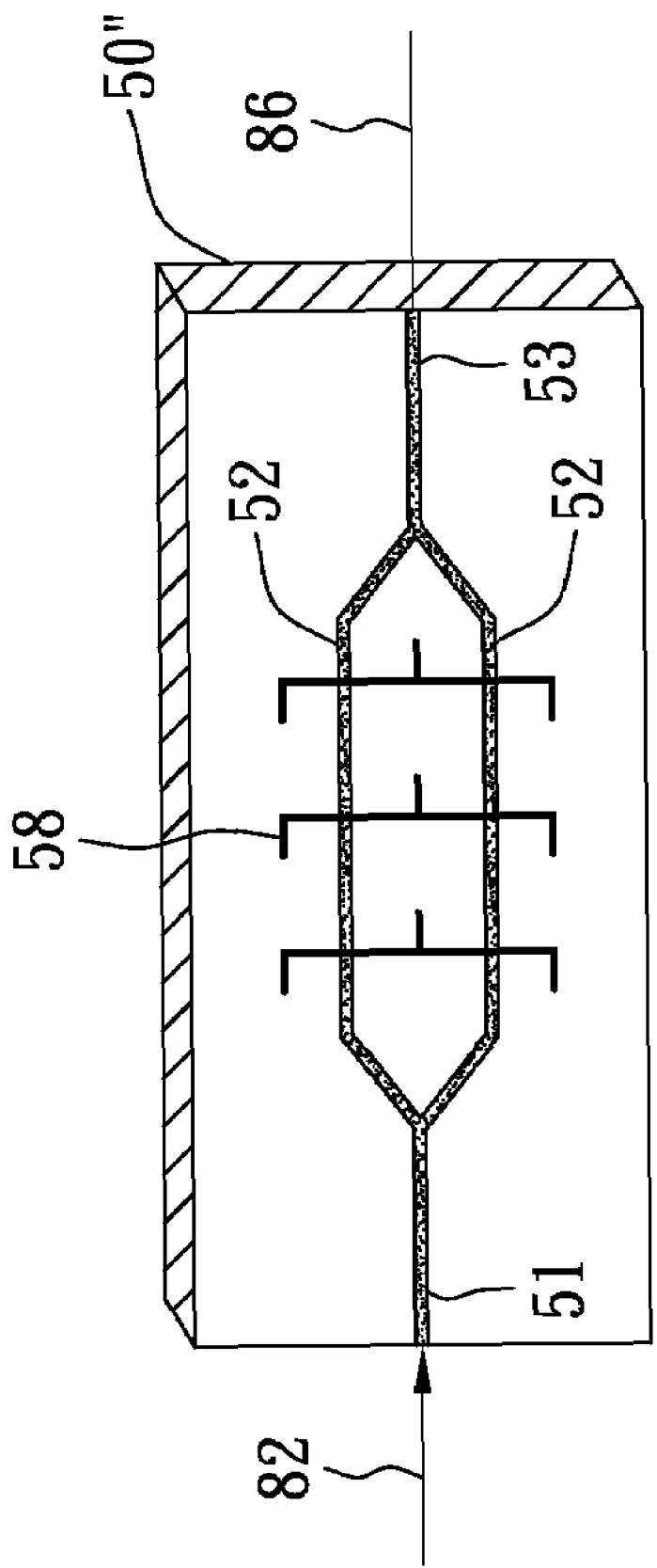
FIG. 10 illustrates an optical modulator according to a third embodiment of the present invention.

FIG. 10 illustrates an optical modulator 50" according to a third embodiment of the present invention. Compared with the optical modulator 50 in FIG. 6 using the external dipole antenna 70 to sense the modulated scattering signal generated by the optically modulated scattering module 10, the optical modulator 50" in FIG. 10 has an electrode pattern 58 disposed on the surface of the substrate above the optical modulation waveguides 52 for sensing the modulated scattering signal generated by the optically modulated scattering module 10 without an external antenna. Further, the optical modulator 50" can substitute the optical modulator 50 shown in FIGS. 8(*a*)-8(*b*) without using the external antenna 70. Moreover, the optical modulator 50' in FIG. 9 can adopt the electrode pattern 58 in FIG. 10 to substitute the conductive segments 98A, 98B on the surface of the substrate 90 so as to sense the modulated scattering signal generated by the optically modulated scattering module 10 without using an external antenna.

The optoelectronic system for sensing an electric field signal according to the embodiment of the present invention integrates the low-interference optically modulated scattering module and the low-interference optoelectronic sensing module to sense the distribution of the electric field under test, which can be applied to sensing the near-field, SAR distribution, electric wave broadcasting, and electro-compatibility analysis and so on. Moreover, the present invention also possesses advantages of low interference and low cost.

The above-described embodiments of the present invention are intended to be illustrative only. Numerous alternative embodiments may be devised by those skilled in the art without departing from the scope of the following claims.

What is claimed is:

1. An optoelectronic system for sensing an electric field signal, comprising:

An optically modulated scattering module to convert an electric field signal into a modulated scattering signal based on an optical modulation signal, wherein the optically modulated scattering module comprises at least one optically modulated scattering including:
A substrate;
At least one scattering antenna having a first conductive segment and a second conductive segment disposed on the substrate;
At least one optical switch connected to the first conductive segment and the second conductive segment; and
At least one optical waveguide configured to transmit the optical modulation signal to the optical switch;
An optoelectronic sensing module to receive the modulated scattering signal;
A detection circuit to detect the modulated scattering signal received by the optoelectronic sensing module based on an electric modulation signal; and
A signal processing circuit electrically connected to the detection circuit and to calculate the amplitude and phase of the electric field signal,
Wherein the optically modulated scattering module comprises a plurality of scattering antenna sets disposed on the substrate in an array manner, and each of the scattering antenna sets includes a first scattering antenna and a second scattering antenna perpendicular to the first scattering antenna.

2. The optoelectronic system for sensing an electric field signal as claimed in claim 1, further comprising:
a modulation circuit to generate the electric modulation signal; and
at least one light source to generate the optical modulation signal based on the electric modulation signal.

3. The optoelectronic system for sensing an electric field signal as claimed in claim 2, wherein the light source is a laser.

4. The optoelectronic system for sensing an electric field signal as claimed in claim 2, wherein the light source is a light-emitting diode.

5. The optoelectronic system for sensing an electric field signal as claimed in claim 1, wherein the optoelectronic sensing module comprises:
an optical modulator to change the phase of an optical wave propagating therethrough based on an applied electric field;
an optical detector coupled to the optical modulator;
a first optical fiber coupled to a light source and the optical modulator; and
a second optical fiber coupled to the optical modulator and the optical detector.

6. The optoelectronic system for sensing an electric field signal as claimed in claim 5, wherein the optical modulator comprises:
a substrate;

an optical input waveguide disposed in the substrate and coupled to the first optical fiber;

an optical output waveguide disposed in the substrate and coupled to the second optical fiber;

two optical modulation waveguides disposed in the substrate and having a first end coupled to the optical input waveguide and a second end coupled to the optical output waveguide; and an electrode pattern disposed on the surface of the substrate.

7. The optoelectronic system for sensing an electric field signal as claimed in claim 5, wherein the optoelectronic sensing module further comprises an external antenna coupled to the optical modulator.

8. The optoelectronic system for sensing an electric field signal as claimed in claim 7, wherein the external antenna is a dipole antenna.

9. The optoelectronic system for sensing an electric field signal as claimed in claim 7, wherein the external antenna is a circularly polarized antenna.

10. The optoelectronic system for sensing an electric field signal as claimed in claim 1, wherein the optoelectronic sensing module comprises:

a light source to generate a light beam;

a circulator including at least a first port, a second port and a third port, wherein the light beam is input via the first port and output via the second port;

an optical modulator connected to the second port and to change the phase of an optical wave propagating therethrough based on an applied electric field; and an optical detector connected to the third port.

11. The optoelectronic system for sensing an electric field signal as claimed in claim 10, wherein the optical modulator comprises:

a substrate;

a mirror disposed on a side surface of the substrate;

an optical input/output waveguide disposed in the substrate;

two optical modulation waveguides disposed in the substrate and having a first end coupled to the optical input/output waveguide and a second end terminated at the mirror; and an electrode pattern disposed on the surface of the substrate.

12. The optoelectronic system for sensing an electric field signal as claimed in claim 10, wherein the optoelectronic sensing module further comprises an external antenna coupled to the optical modulator.

13. The optoelectronic system for sensing an electric field signal as claimed in claim 12, wherein the external antenna is a dipole antenna.

14. The optoelectronic system for sensing an electric field signal as claimed in claim 12, wherein the external antenna is a circularly polarized antenna.

15. The optoelectronic system for sensing an electric field signal as claimed in claim 1, wherein the optically modulated scattering module comprises two optically modulated scatterers in an orthogonal manner.

16. The optoelectronic system for sensing an electric field signal as claimed in claim 1, wherein the optoelectronic sensing module comprises a receiving antenna, and the included angle between the receiving antenna and the first scattering antenna is less than 90°.

17. The optoelectronic system for sensing an electric field signal as claimed in claim 1, wherein the optoelectronic sensing module comprises a first receiving antenna parallel to the first scattering antenna and a second receiving antenna parallel to the second scattering antenna.

18. The optoelectronic system for sensing an electric field signal as claimed in claim 1, wherein the optically modulated scattering module comprises:

a plurality of optically modulated scatterers;

an address generator to generate an address signal; and a demultiplexer to enable at least one light source to generate the optical modulation signal based on the address signal.

19. The optoelectronic system for sensing an electric field signal as claimed in claim 1, wherein the optically modulated scattering module comprises a plurality scattering antenna sets disposed on the substrate in an array manner, and each of the scattering antenna sets includes a first scattering antenna and a second scattering antenna perpendicular to the first scattering antenna.

* * * * *